UNITED STATES PATENT OFFICE.

EGBERT CORNELIS SUTHERLAND, OF DEVENTER, NETHERLANDS, ASSIGNOR TO NAAMLOOZE VENNOOTSCHAP INDUSTRIEELE MAATSCHAPPIJ V. H. NOURY EN VAN DES LANDE, OF DEVENTER, NETHERLANDS.

PROCESS FOR INCREASING THE YIELD OF BREAD.

1,372,842.     Specification of Letters Patent.     Patented Mar. 29, 1921.

No Drawing.     Application filed September 18, 1917. Serial No. 191,949.

*To all whom it may concern:*

Be it known that I, EGBERT CORNELIS SUTHERLAND, a citizen of the Kingdom of the Netherlands, residing at Deventer, Kingdom of the Netherlands, have invented a new and useful Process for Increasing the Yield of Bread; and I do hereby declare the following to be a full, clear, and exact description of the same.

It is well known in the art of breadmaking that the quantity of bread, which can be baked from a certain quantity of flour, meal, or other milling-product is limited, and depends on the amount of liquid the flour or other material will absorb during the preparation of the dough.

Now I have found that it is possible to increase the yield of bread of flour, meal or other milling-products (such, for instance, as groats, grit and other coarse ground corn) considerably by means of a new process in which I use cold and heat to work on the flour, meal, etc.

In the most simple form of my process I subject the material to be treated to an intense cooling, and I have found that good results can be obtained by subjecting the materials to be treated to a fall of temperature of about 40° C. or more, but also with a smaller degree of cooling results can be obtained. This cooling treatment is preferably carried out rapidly, taking care however to avoid proceeding so quickly with the treatment as to cause bursting of the grains.

It is not necessary that the material should have a certain temperature at the time when the cooling action is begun; the cooling can be started at any desired point, provided the cooling is intense enough. So for instance the material may be cooled from 40° C. to 0° C. or from +20° C. to −20° C. The cooling will however prove the most efficient if continued to a point below the freezing-point of water. Therefore it is preferable to use artificial cooling-materials such as liquid carbonic acid, sulfurous acid or sal-ammoniac.

It will prove exceedingly expedient to effect the cooling not by bringing the milling product into direct contact with flowing cooled air, gas or any other cold fluid, but in some indirect way viz. by passing the milling-product through jacketed cylinders provided with worm conveyers or other transporting means, the jackets being filled up with one of these cooling-materials. If flowing cold air or the like should come in immediate contact with the milling-product the air would carry away the finest parts of the milling-product, which means not only a loss of quantity but at the same time a withdrawal of highly valuable parts from the materials, and which would thus have an injurious influence as to taste and flavor. By conducting the milling-product through a closed cooled space these parts remain in the product. If however a cooling material is needed which will work immediately it is expedient to withdraw the flour dust or flour from the cooling gas or the cooling air by way of a dust receiver and the steam by means of suitable condensers and then mix the flour separated in this way as well as the condensed water or liquid with the milling-materials from which they were withdrawn. If it is not possible to attain the required cooling effect, with regard to the fall of temperature in one operation the material may be preliminarily heated and then cooled. So a milling-material of 10° C. may first be heated up to 40° C. and then be cooled to or under 0° C. In order to prevent the heat from injuring the milling-material the temperature should not be raised too high,—(by preference not over 60° C. to 75° C.), and the heating should be effected as quickly as possible. It is furthermore important that the higher the temperature is to which the products have been heated, the sooner the cooling should follow.

The effect of the treatment is increased by a preliminary heating such as that just described; but it is expedient not to have the same effected by an immediate contact of the material with a flowing heating means (such as hot air or steam). It is advisable however to produce indirect heating by means of a heating-jacket or any other appliance and this is even of still more importance with regard to the heating since valuable substances of a more or less aromatic character than with regarding to the cooling, might be removed from the milling-material by the action of the heat.

It is therefore preferable to work in a closed apparatus, so that the vapors given off remain with the milling-material and are condensed again on the milling-material by the subsequent cooling.

If, however, heating gases are used which act immediately, the recovery of the parts of dust and of the water taken away in the manner above described and their return to the milling-material are here of the utmost importance.

The treatment here described may be carried out in an apparatus consisting of worm-conveyers through which the milling-material is passed (or in any other jacketed apparatus) or in any apparatus for artificially cooling or heating. The jackets are alternately cooled and heated. It must be remarked that it will prove profitable to repeat the treatment described before, since repeated treatment ameliorates the qualities of the milling-material.

Not only the yield of bread of the milling-products is increased, but moreover the baking qualities of these milling-products used for baking, are ameliorated.

As by the cooling and heating of the material lumps and clods may be formed which may by any subsequent heating or cooling impede the quick and regular diffusion of temperature it is recommendable after every cooling or heating to effect a dissolution of these clods which may be done effectually by rubbing, whipping, throwing etc. the material by means of suitable apparatuses.

When reference is made to "milling-products" in the specification and claims, it is understood to include all kinds of flour, meal, groats, grit and other ground corn and the like.

Claims:

1. A process of treating milling products to increase the weight of bread obtained therefrom, which consists in heating the product to a temperature not exceeding approximately 75° C. while maintaining the same in substantially normal pulverulent condition, and then subjecting it to an intense cooling action.

2. A process of treating milling products to increase the weight of bread obtained therefrom, which consists in heating the product to a temperature not exceeding approximately 75° C. while maintaining the same in substantially normal pulverulent condition, and cooling it rapidly to lower its temperature approximately 40° C.

3. A process of treating milling products to increase the weight of bread obtained therefrom, which consists in repeatedly subjecting the product to heating and cooling actions while maintaining the same in substantially normal pulverulent condition, the heating not exceeding a temperature of approximately 75° C. and the cooling being rapid and intense.

4. A process of treating milling products to increase the weight of bread obtained therefrom, which consists in heating the product to a temperature not exceeding approximately 75° C. while maintaining the same in substantially normal pulverulent condition, and then subjecting it to an intense cooling action by means of a cooling medium, while maintaining the product out of direct contact with such medium.

5. A process of treating milling products to increase the weight of bread obtained therefrom, which comprises the steps of alternately heating the product to a temperature not exceeding approximately 75° C. while maintaining the same in substantially normal pulverulent condition, and rapidly cooling it by means of gaseous heating and cooling media, while maintaining the product out of direct contact with such media.

6. A process of treating milling products to increase the weight of bread obtained therefrom, which consists in subjecting the product to a sequence of operations which comprises heating the product to a temperature between 40° C. and 65° C. and cooling it rapidly to lower its temperature to a point at least as low as 0° C. while maintaining the same in substantially normal pulverulent condition.

In testimony whereof, I have signed my name to this specification in the presence of two subscribing witnesses.

EGBERT CORNELIS SUTHERLAND.

Witnesses:
KEES ADRIANUS LOETHOUT,
JANNES JEN PONTRINER.